United States Patent
Tu et al.

(10) Patent No.: US 12,487,390 B2
(45) Date of Patent: *Dec. 2, 2025

(54) POLARIZER

(71) Applicant: BenQ Materials Corporation, Taoyuan (TW)

(72) Inventors: Yu-Wei Tu, Taoyuan (TW); Chih-Wei Lin, Taoyuan (TW); Kuo-Hsuan Yu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 437 days.

This patent is subject to a terminal disclaimer.

(21) Appl. No.: 18/298,362

(22) Filed: Apr. 10, 2023

(65) Prior Publication Data

US 2024/0027667 A1    Jan. 25, 2024

(30) Foreign Application Priority Data

Jul. 21, 2022   (TW) .................................. 111127160

(51) Int. Cl.
*G02B 5/30*   (2006.01)
*G02B 1/14*   (2015.01)

(52) U.S. Cl.
CPC .............. *G02B 5/3033* (2013.01); *G02B 1/14* (2015.01); *G02B 5/3083* (2013.01)

(58) Field of Classification Search
CPC ...... G02B 5/3033; G02B 5/3083; G02B 5/30; G02B 5/3025; G02B 5/02; G02B 5/0205;
(Continued)

(56) References Cited

U.S. PATENT DOCUMENTS

| | | | |
|---|---|---|---|
| 2010/0128211 A1* | 5/2010 | Matsuda | G02B 5/3083 252/299.61 |
| 2013/0279155 A1* | 10/2013 | Kuroda | G09F 13/04 362/97.4 |

(Continued)

FOREIGN PATENT DOCUMENTS

JP   2008003541 A   *   1/2008   ........... G02B 5/3033

*Primary Examiner* — Stephone B Allen
*Assistant Examiner* — Adam W Booher

(57) ABSTRACT

A polarizer applied for a viewing side of a display is disclosed. The polarizer comprises a polarizing layer with an absorption axis, and a protective film disposed on the viewing side surface of the polarizing layer. The protective film includes a birefringent substrate adjacent to the polarizing layer having a birefringence difference not greater than 0.10 and having a slow axis and a fast axis perpendicular to each other, wherein the slow axis is parallel to the absorption axis of the polarizing layer, and an interference elimination layer disposed on a display side surface of the birefringent substrate, wherein the interference elimination layer has a diffusing layer disposed on the birefringent substrate, and a refractive-index-matching layer disposed on the diffusing layer, wherein with the total haze of the protective film is between 30% and 75% and the reflectivity of the protective film satisfies the relationship $(R_{SCI}-R_{SCE}) \leq 1.0\%$ and $R_{SCE}/(R_{SCI}-R_{SCE}) \geq 1.6$, wherein $R_{SCI}$ is an average reflectivity of diffuse component and specular component (specular component included, SCI) of the protective film, and $R_{SCE}$ is an average reflectivity of diffuse component (specular component excluded, SCE) of the protective film.

12 Claims, 3 Drawing Sheets

(58) Field of Classification Search
CPC .. G02B 5/0236; G02B 5/0242; G02B 5/0278; G02B 5/0294; G02B 1/14; G02B 1/10; G02B 1/11
See application file for complete search history.

(56) References Cited

U.S. PATENT DOCUMENTS

2019/0049791 A1* 2/2019 Yanai .................... G02F 1/1323
2024/0027669 A1* 1/2024 Tu ........................ G02B 5/0242

* cited by examiner

POLARIZER

CROSS-REFERENCE TO RELATED APPLICATION

This application claims the priority benefit of Taiwanese Application Serial Number 111127160, filed on Jul. 21, 2022, which is incorporated herein by reference.

FIELD OF THE INVENTION

The present invention relates to a polarizer for display, and especially a polarizer applied for a viewing side of a display to eliminate the rainbow mura resulting from the interference of the reflective light.

BACKGROUND OF THE INVENTION

Conventional display devices are equipped with display panels with periodically aligned pixels. When a protective film with high light transmission is used on the viewing side of the display, the display image light with a specific wavelength or the ambient light is easy to enter the display panel and then reflect to occur interference fringes. The interference fringes can be canceled by forming a rough surface or a concave-convex structure surface on the protective film disposed on the viewing side of the display to interrupt the periodicity of light. However, this solution will result in poor gloss of the display surface and cloudiness and blur of the display image. Moreover, due to the requirements of high display quality and the development trend of liquid crystal display (LCD), OLED display and micro LED display toward high brightness, slim and flexibility, the stack structure of optical functional films at the viewing side of the display are complicated and the optical property compatibility of those optical functional films are required higher in order to enhance the display quality, slimming and flexibility of the display. Even the outside protective film is used together with high light-transmittance polarizers or with circular polarizers for electroluminescent displays, the protection and the optical properties of the protective film cannot be sacrificed. Recently, the polyesters with crystallinity are used to replace the tri-cellulose acetate (TAC) which has no in-plane retardation (R0≈0 nm) as the protective film to provide a good moisture-permeable resistance and mechanical strength. The polyesters, such as polyethylene terephthalate (PET), with high crystallinity because of benzene rings so as to have birefringence, are prepared by single-axial or bi-axial stretching process to have a high birefringence and a high in-plane retardation (R0≥3000 nm).

Being different from the TAC protective film without an in-plane retardation, the high birefringence and high in-plane retardation of the polyester protective film make the polyester film unable to be used as the protective film disposed on the display panel side of the polarizer. When the polyester film with a high in-plane retardation is used as the protective film of the polarizer disposed on the viewing side, because the refractive index difference between the polyester film and air makes the reflectivity be more than 5.0%, the light with certain wavelength entering into the periodically aligned pixels of display panel and being reflected will generate interference fringe of bright and dark bands, and, in high-intense ambient light situation, the light with visible wavelength entering and be reflected respectively at the boundaries of the both sides of the birefringence protective film will generate rainbow mura to affect the quality of display. Moreover, the polyester film with a high birefringence may have slightly uneven thickness to cause the in-plane retardation of the polyester film obviously various. The area with various in-plane retardations of the polyester film is easily to generate interference rainbow mura. Such rainbow mura is hard to cancel via rough surface or concave-convex structure for interrupting the periodicity of light for common interference pattern.

As shown in FIG. 1, it is a perspective view of a polarizer disposed on the viewing side of a display in prior art. The polarizing layer 100 and the protective film 110 of the polarizer 10 are both fabricated by stretching process to have an absorption axis 100a and a slow axis 110a in stretching direction, respectively. The absorption axis 100a was disposed as shown in regular horizontal display direction (X axis) and the slow axis 110a was disposed as shown in orthogonal display direction (Y axis). The ambient L, such as outdoor sunshine or indoor lighting, is usually disposed as a higher irradiating angle. When an ambient light L from air with lower refractive index is incident into the protective film 110 of the polarizing layer 100 via an incident angle θ which is not zero, the light splits into a S-polarized light component in X-axis direction, the polarization direction of which is perpendicular to the light path (i.e. Y-Z plane), and a P-polarized light component in a polarization direction parallel to the light path, because the reflectivity of the S-polarized light component is higher than that of the P-polarized light component, especially the incident angle θ of the ambient light L meets the Brewster angle, the reflective light L1 reflected at the interface between the protective film 110 and air is 100% S-polarized light. The transmitted P-polarized light which is reflected into the protective film 110 is retarded in the slow axis 110a direction of the Y-Z plane, and the light with increased ellipticity will be converted into a part of S-polarized light such that the reflective light L2 will comprises more S-polarized light component. Therefore, the reflective lights L1 and L2 at the boundaries of the both sides of the protective film 110 are highly coherent to occur rainbow interference pattern.

It has been proposed solutions for the rainbow interference pattern in protective film, as described in Taiwanese Patent TWI406001, the patent discloses an optical layered body comprising a polyester base having a retardation (in-plane retardation, R0) of not less than 8000 nm to reduce the problem of the rainbow interference pattern and the interference fringes by coordinating the refractive index of the primer on the base, a hard coating and the polyester base. Taiwanese Patent TWI531472 describes a polarizer with a protection film having an in-plane retardation (R0) of greater than 10,000 nm and a thickness direction retardation (Rth) of 10,000 nm to 12,000 nm to solve the problems of rainbow stain on the protective film. The above patents teach to use a protective film with high in-plane retardation. The in-plane retardation (R0) is calculated by Equation (1) R0=(nx−ny)*d. From the Equation (1), the in-plane retardation R0 can be increased in two ways, i.e., by increasing the difference (nx−ny) between the refractive index (nx) in slow axis direction and the refractive index (ny) in fast axis direction, or by increasing the thickness (d) of the protective film. The solutions for increasing the birefringence in slow axis direction and the fast axis direction comprises the modification of the functional groups of polyester or increasing the stretching ratio in the fabrication process to improve the orientation of the molecular alignment. However, these solutions may affect the rigidity of the polyester material. The over-stretched polyester may increase the birefringence but also the fragile to lose the flexibility. The modification of functional groups of the polyester materials and the change of the stretching process may increase the difficulties of the manufacture. To increase the thickness (d) is a simpler solution, but it is away from the current trend toward slim displays. Moreover, the increased thickness (d) of the protective film may affect the bending stress distribution of the flexible display so as to increase the design and development difficulties for matching the other compatible optical functional films of the displays. Therefore, by increasing the in-plane retardation of the polyester protective film to avoid the light of visible wavelength to be interfered at the boundary of the two sides of films is not effective and may results in the unexpected defects.

SUMMARY OF THE INVENTION

The present invention is to provide a polarizer for the viewing side of a display, which comprises a polarizing layer having an absorption axis; and a protective film disposed on the viewing side of the polarizing layer, wherein the protective film comprises a birefringent substrate disposed adjacent to the polarizing layer having a birefringence ($\Delta n$) of not more than 0.10, and the birefringent substrate has a slow axis and a fast axis perpendicular to each other, and the slow axis is parallel to the absorption axis of the polarizing layer, and an interference elimination layer disposed on the display side surface of the birefringent substrate, which comprises a light diffusion layer disposed on the birefringent substrate and a refractive-index-matching layer disposed on the light diffusion layer, wherein the total haze of the protective film ranges between 30% and 75%, and the reflectivity thereof satisfies the relationship: ($R_{SCI}-R_{SCE}$) $\leq 1.0\%$, and $R_{SCE}/(R_{SCI}-R_{SCE}) \geq 1.6$, wherein $R_{SCI}$ is an average reflectivity of diffuse component and specular component (specular component included, SCI) of the protective film, and $R_{SCE}$ is an average reflectivity of diffuse component (specular component excluded, SCE) of the protective film.

In the polarizer of one embodiment of the present invention, the included angle between the absorption axis of the polarizing layer and the horizontal viewing angle direction of the display ranges between 0° and 45°.

In the polarizer of one embodiment of the present invention, the birefringence of the birefringent substrate ranges between 0.02 and 0.09 and preferably ranges between 0.02 and 0.08.

In the polarizer of one embodiment of the present invention, the ($R_{SCI}-R_{SCE}$) of the protective film ranges between 0.1% and 1.0%.

In the polarizer of one embodiment of the present invention, the light diffusion layer has a refractive index of n1, the refractive-index-matching layer has a refractive index of n2, and n2 is less than n1.

In the polarizer of one embodiment of the present invention, the refractive index of n1 ranges between 1.50 and 1.70 and the refractive index of n2 ranges between 1.20 and 1.50.

In the polarizer of one embodiment of the present invention, the average reflectivity of diffuse component (specular component excluded) $R_{SCE}$ of the protective film is less than 2.0%, and preferably ranges between 0.8% and 2.0%.

In the polarizer of one embodiment of the present invention, the total haze of the protective film is the sum of the surface haze and the internal haze of the protective film, wherein the surface haze of the protective film is more than 25%.

In the polarizer of one embodiment of the present invention, the thickness of the light diffusion layer ranges between 2 μm and 10 μm.

In the polarizer of one embodiment of the present invention, the thickness of the refractive-index-matching layer ranges between 0.1 μm and 0.3 μm.

In the polarizer of one embodiment of the present invention, the thickness of the birefringent substrate ranges between 10 μm and 150 μm.

In the polarizer of one embodiment of the present invention, the birefringent substrate is a uniaxial or biaxial stretched polyester film.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or methacrylate.

Figure 1:
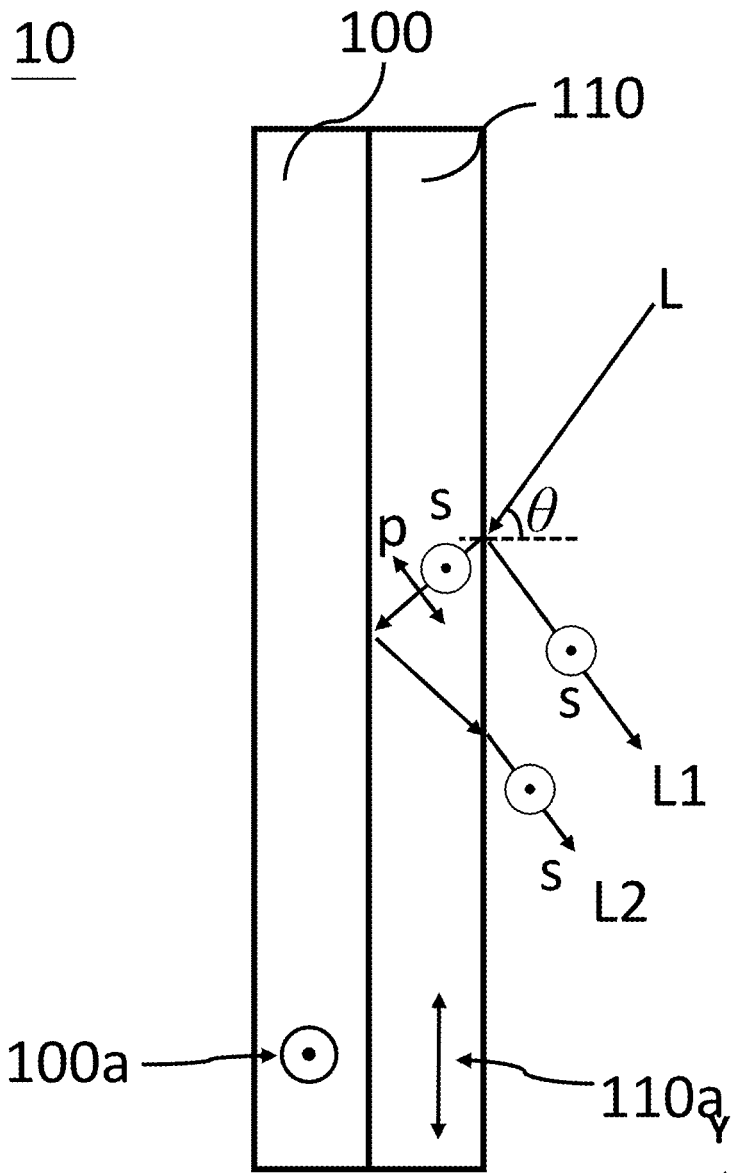
FIG. 1 is a perspective view of a polarizer disposed on the viewing side of a display in prior art.
Figure 2:
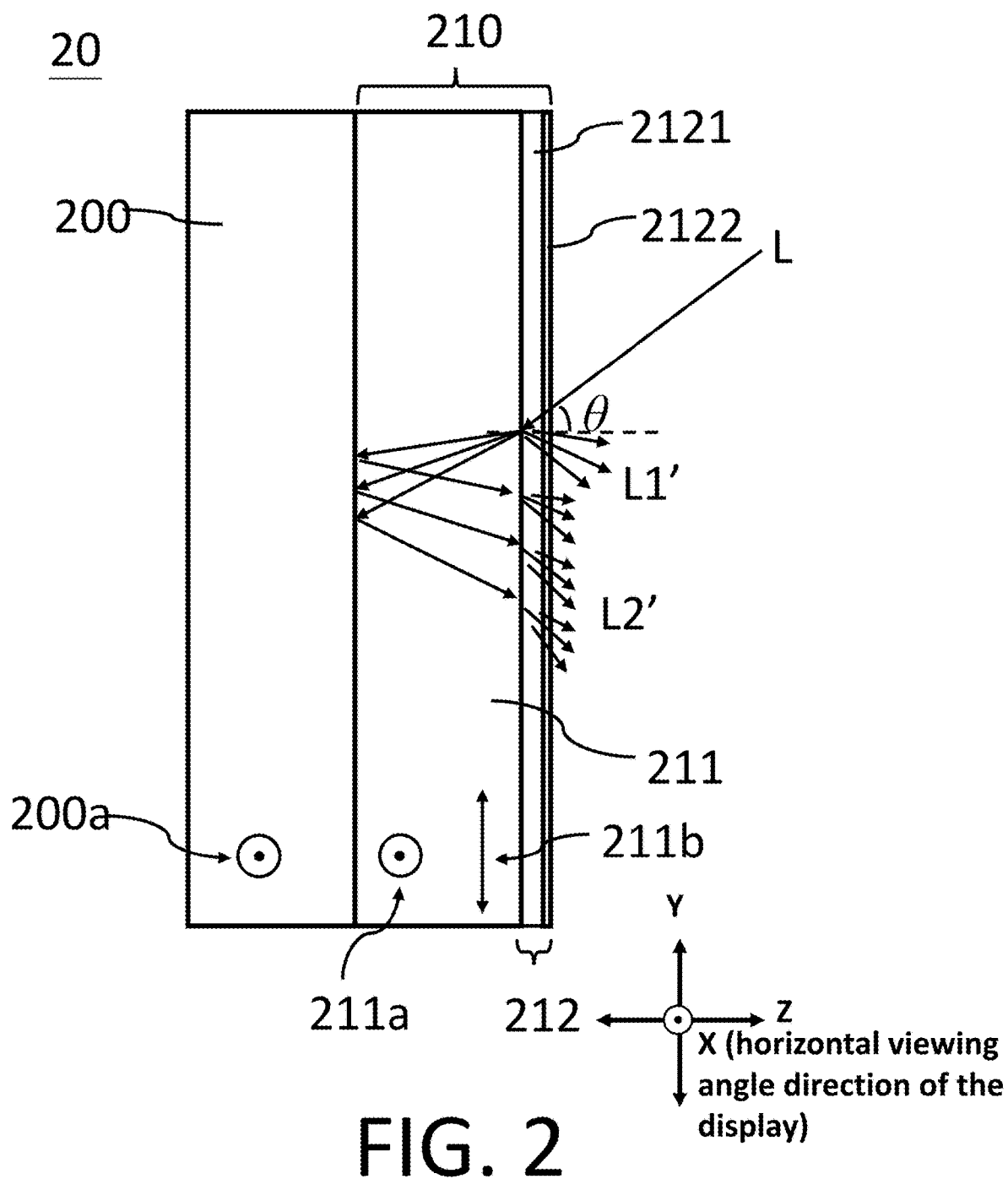
FIG. 2 is a perspective view of a polarizer disposed on the viewing side of a display of an embodiment of the present invention.

Referring to FIG. 2, an aspect of the present invention is to provide a polarizer 20 disposed on the viewing side of a display, which comprises a polarizing layer 200 with an absorption axis 200a; and a protective film 210 disposed on the viewing side of the polarizing layer 200, wherein the protective film 210 comprises a birefringent substrate 211 disposed adjacent to the polarizing layer 200 and having a birefringence (Δn) of not more than 0.10, and the birefringent substrate 211 comprises a slow axis 211a and a fast axis 211b perpendicular to each other, and the slow axis 211a is parallel to the absorption axis 200a of the polarizing layer 200, and an interference elimination layer 212 disposed on the display side surface of the birefringent substrate 211, wherein the interference elimination layer 212 comprises a light diffusion layer 2121 disposed on the birefringent substrate 211, and a refractive-index-matching layer 2122 disposed on the light diffusion layer 2121. The total haze of the protective film 210 ranges between 30% and 75%, and the reflectivity thereof satisfies the relationship: $(R_{SCI}-R_{SCE}) \leq 1.0\%$, and $R_{SCE}/(R_{SCI}-R_{SCE}) \geq 1.6$, wherein $R_{SCI}$ is an average reflectivity of diffuse component and specular component (specular component included, SCI) of the protective film 210, and $R_{SCE}$ is an average reflectivity of diffuse component (specular component excluded, SCE) of the protective film 210.

The polarizing layer 200 and the birefringent substrate 211 of the polarizer 20 are both prepared by stretching process and obtained in form of rolls. The polarizing layer 200 has an absorption axis 200a parallel to the stretching direction and the birefringent substrate 211 has a slow axis 211a parallel to the stretching direction and a fast axis 211b perpendicular to the slow axis 211a. The polarizing layer 200 is adhered to the birefringent substrate 211 in a manner that the absorption axis 200a of the polarizing layer is parallel to the slow axis 211a of the birefringent substrate 211. Particularly, when the absorption axis 200a is also parallel to the horizontal viewing angle direction of a display, as the ambient light L is incident into the interference elimination layer 212, the coherence and directionality of the ambient light is interrupted by the high-haze light diffusion layer 2121 and the S-polarized light component generated in the birefringent substrate 211 is also absorbed by the polarizing layer 200 due to the polarizing direction thereof parallel to the absorption axis 200a, so that the reflection intensity is reduced. Because the polarizing direction of the P-polarized light component is perpendicular to the slow axis 211a of the birefringent substrate 211, the P-polarized light component is insusceptible by the phase retardation thereof to convert into highly reflective S-polarized light component. Thus, even the P-polarized light component reflects and re-passes through the interference elimination layer 212 to generate a reflective light L2' which will not interfere with the reflective light L1' reflected by the interference cancellation layer 212 on the surface of the birefringent substrate 211. The polarizing layer 200 of the polarizer 20 and the protective film 210 can be used in roll-to-roll continuous lamination process to fabricate the present polarizer 20 with the absorption axis 200a about parallel to the slow axis 211a to increase the efficiency of the roll-to-roll lamination process.

In an embodiment of the polarizer of the present invention, the included angle between the absorption axis 200a of the polarizing layer 200 and the horizontal viewing angle of the display can be various according to the types and the applications of the displays and is preferably in the range of 0° to 45°. In this range, the ambient light from the upper side irradiating to the display comprises a certain projection component in horizontal direction in respect to the absorption axis 200a so as to sufficiently cancel the reflective intensity of the S-polarized light component.

It is known to use polyester film as a protective film. Since the reflective index of the polyester film without any surface treatment is more than 5.0%, the polyester film without any surface treatment is required to have an in-plane retardation R0 of more than 8000 nm, high light-diffusion surface or a high thickness to reduce the rainbow mura or rainbow interference pattern. However, the birefringent substrate 211 used in the protective film of the present invention does not require a high in-plane retardation R0, that is, the in-plane retardation R0 is not more than 8000 nm and the birefringent substrate with a thickness in the range of 10 μm to 150 μm and preferably in the range of 15 μm to 100 μm.

Therefore, the requirement of the in-plane retardation R0 of the birefringent substrate 211 disclosed in the present invention has a wider tolerance. It is preferred to use a polyester film with an in-plane retardation R0 in the range of 1000 nm and 6000 nm, and the rainbow mura defect is not prone to appear. However, not only a film with the in-plane retardation in the above-mentioned range can be used as the birefringent substrate 211, but also a polyester film which provides the desired mechanical strength and moisture-permeable resistance and is fabricated with desired crystallinity materials under a proper stretch ratio to provide a birefringence of no more than 0.10 to match the interference elimination layer 212 and the direction of the absorption axis of the polarizing layer 200 can be used as the birefringent substrate 211 to fabricate the polarizer 20.

Furthermore, the protective film 210 of the present polarizer 20 utilizing a birefringent substrate 211 to eliminate rainbow mura and interference pattern resides in reducing the intensity of reflective light and reducing the coherence and directionality of the reflective light such that even the polarizer is improved to reduce the thickness and increase the light transmission thereof, the polarizer still can provide sufficient diffusion light path length to reduce the intensity of the reflective light so as to eliminate rainbow mura and interference pattern. It is known from the Equation (2) $R=(N2-N1)^2/(N2+N1)^2$ that the reflection R of the light at the boundary between two different materials is relevant to the respective refractive index of the materials. When light from air or film with refractive index N1 incidents into the birefringent substrate with refractive index N2, for increasing the birefringence of the birefringent substrate, the refractive index of the slow axis in the stretching direction will be increased, this is adverse to reduce the total reflectivity R. Therefore, the birefringence of the birefringent substrate is no more than 0.10, and the birefringence of the birefringent substrate is preferably in the range of 0.02 to 0.09 and more preferably in the range of 0.02 to 0.08.

The interference elimination layer 212 of the present protective film comprises a composite laminate of a light diffusion layer 2121 and a refractive-index-matching layer 2122 to simultaneously reduce the coherence of the reflective light via the effect of the light diffusion layer 2121 and the intensity of reflective light via the effect of the refractive-index-matching layer 2122. In the protective film 210 of the present invention, the refractive index of the light diffusion layer 2121 of the interference elimination layer 212 is n1 and the refractive index of the refractive-index-matching layer 2122 is n2, and the refractive index n2 is less than the refractive index n1. The refractive index n1 ranges between 1.50 and 1.70 and the refractive index n2 ranges between 1.20 and 1.50. Because of the high crystallinity of the polyester material, even the birefringence thereof is lowered to less than or equal to 0.10, the average of the refractive index thereof is more than about 1.60. Thus, when a light diffusion layer 2121 and a refractive-index-matching layer 2122 both with refractive index of 1.00 to 1.60 are disposed between the birefringent substrate 211 and the air (refractive index is about 1.00), the reflectivity of the total ambient light is lowered, as obtained from the result calculating by formulation 2, and the coherence-interruption obtained from that the ambient light repeatedly passes through the light diffusion layer 2121 will not be affected. In this condition, the light diffusion layer 2121 preferably can use the material with refractive index n1 of 1.55 and the refractive-index-matching layer 2122 preferably can use the material with refractive index n2 of 1.40, and the refractive index n2 is less than the refractive index n1.

Figure 3:
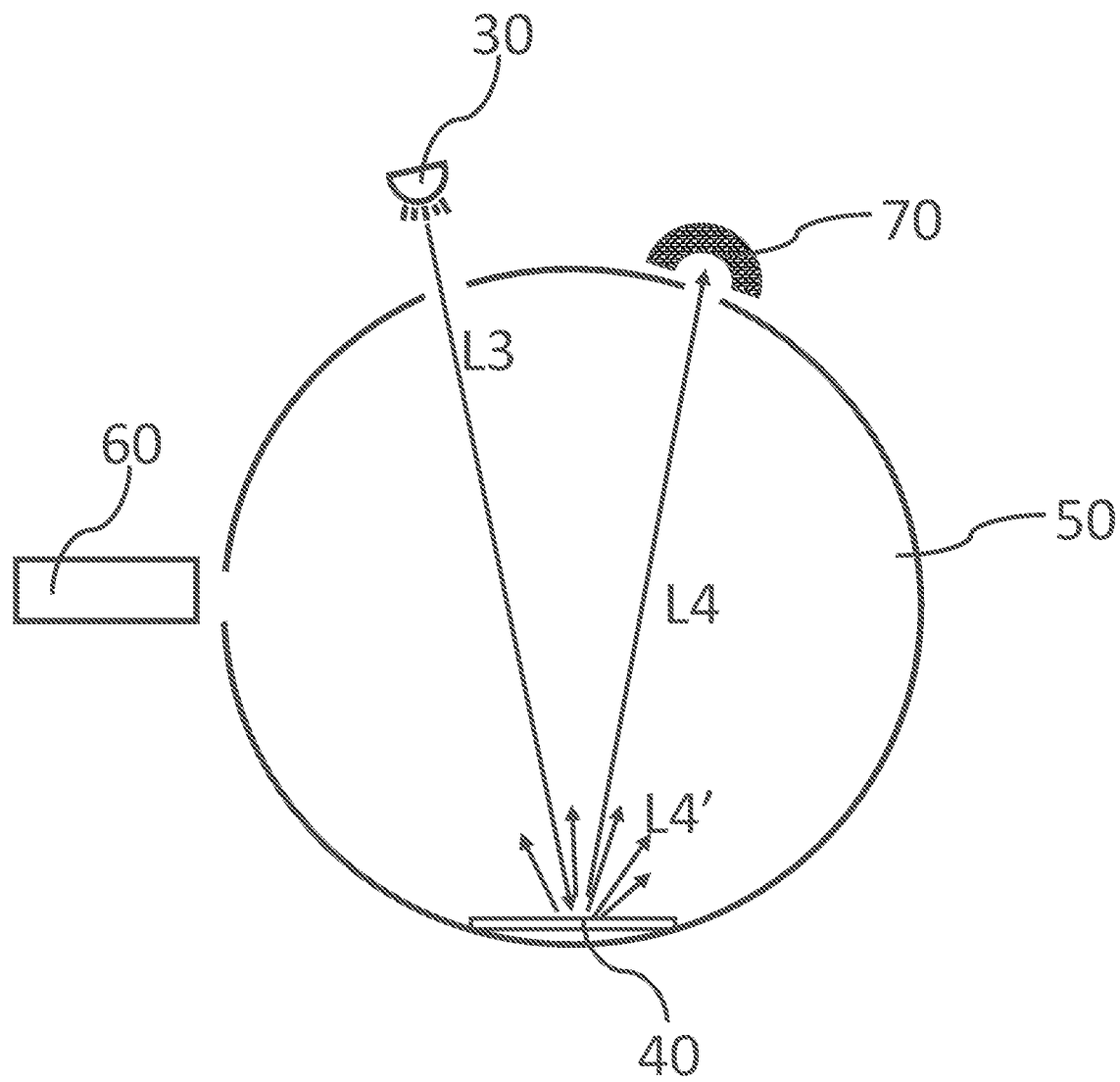
FIG. 3 is a schematic diagram showing the reflectivity measuring principles of the SCI mode and SCE mode.

The reflectivity is measured by adhering the protective film 210 via an optical adhesive to a black acrylic plate instead of a display with orthogonal-axes polarizers and measuring the average diffuse and specular reflectivity of SCI (Specular Component Included) mode and the average reflectivity of diffuse reflectivity of SCE Specular Component Excluded) mode of the viewing side of the protective film 210 by HITACHI U-4150 spectrometer in a wavelength range of 380-780 nm. FIG. 3 is a schematic diagram showing the measuring principles of the SCI mode and SCE mode. The light L3 emitted by the light source 30 enters the sample 40 at a fixed angle, and forms directly reflected specular reflective light L4 and diffusing light L4', which are collected by the integrating sphere 50 and then received by the detector 60. The reflectivity obtained when the detector 60 receives the specular reflective light L4 and the diffusing light L4' is defined as an average reflectivity $R_{SCI}$ of the SCI mode including diffuse and specular reflections. After the optical trap 70 absorbs the specular reflective light L4, the reflectivity obtained when the detector 60 only receives the diffusing light L4' is defined as an average reflectivity $R_{SCE}$ of the SCE mode. Due to the poor coherence of the diffusing light, the specular reflective light L4 is the main interference component, and the average reflectivity of the specular reflective light L4 can be obtained by ($R_{SCI}$-$R_{SCE}$). When restricting ($R_{SCI}$-$R_{SCE}$) of the protective film of the polarizer of the present invention less than or equal to 1.0% and the reflectivity ratio $R_{SCE}$/($R_{SCI}$-$R_{SCE}$) of the diffusing light L4' and specular reflective light L4 of the protective film greater than or equal to 1.6, the occurrence of rainbow mura and interference fringes can be reduced, or even rainbow mura and interference fringes occurs, they are not visible by human eyes due to the insufficient light intensity and contrast. Moreover, the average reflectivity $R_{SCE}$ of diffuse component of the protective film is less than 2.0%, and preferably ranges between 0.8% and 2.0%, so as to maintain the appearance of the protective film close to that without the interference elimination layer and to avoid the excessive light deflection by using rough surface structure of conventional method, which will result in excessive diffuse light and backscattered light, and cause image cloudiness. After the image light emitted by the display passes through the protective film of the polarizer, the light transmittance will not be reduced due to the diffusion layer 2121 of the interference elimination 212, or the surface gloss of the protective layer will not be affected.

In another embodiment of the present polarizer, the ($R_{SCI}$-$R_{SCE}$) of the protective film is preferably in the ranging from 0.1% to 1.0%. On the premise of not affecting the effect of interference elimination, it still has a certain gloss on the surface of the protective film to avoid an imperfect display appearance.

The total haze of the protective film 210 is the sum of the surface haze of the protective film 210 and the internal haze of the protective film 210. In an embodiment of the present polarizer, the total haze of the polarizer is more than 30% in order to convert the direction and coherence of the ambient light entering into the light diffusion layer 2121 of the interference elimination layer 212 without merely relying on the surface roughness of the protective film 210 converting the direction of the reflective light. In a preferred embodiment of the present invention, the surface haze of the protective film 210 is greater than 25%. As the ambient light enters into the protective film 210, the light will penetrate the surface of the interference elimination layer 212 and passes the birefringent substrate 211 to reflect, the internal haze and the surface haze of the light diffusion layer 2121 of the interference elimination layer 212 can provide an extended internal-reflection light path length of the incident ambient light per unit thickness without increasing the total thickness of the interference elimination layer 212 (such as no more than 10 μm) to increase the light path length and diffusion effect and to avoid display images cloudiness or decreased luminous transmission. Furthermore, rainbow mura usually can be seen from the side viewing angle, the increased diffusion light path length for the side incident light can cancel the rainbow mura.

In another embodiment of the present polarizer, the thickness of the light diffusion layer 2121 of the interference elimination layer 212 is between 2 μm to 10 μm and preferably between 3 μm to 8 μm, this thickness thereof is sufficient to provide a diffusion light path length to interrupt the coherence of the ambient light. The thickness of the refractive-index-matching layer 2122 is less than the thickness of the light diffusion layer 2121, such as between 0.1 μm and 0.3 μm, which has the effect of reducing the reflection of the wavelength of visible ambient light. In the present protective film 210, the light diffusion layer 2121 and the refractive-index-matching layer 2122 of the interference elimination layer 212 provide a synergetic effect superior over the solution used in the prior art for reducing interference pattern and rainbow mura, that is, the prior art use of a polyester material with birefringence of 0.10 by increasing the thickness thereof to more than 80 μm for achieving the in-plane retardation up to 8000 nm.

In another embodiment of the present polarizer, the birefringent substrate 211 of the protective film 210 can be a polyester films stretched single-axially or bi-axially and having at least light transmittance of 90%, such as, for example, polyethylene terephthalate (PET), polybutylene terephthalate (PBT) or polyethylene naphthalate (PEN). In an embodiment of the polarizer of the present invention, the protective film can use a birefringent substrate with UV absorbent.

In the protective film 210 of the present polarizer, the light diffusion layer 2121 of the interference elimination layer 211 comprises an acrylate binder resin and a plurality of amorphous silica microparticles and optionally, organic microparticles.

In the protective film 210 of the present polarizer 20, the amorphous silica microparticles suitable used in the light diffusion layer 2121 have a laser diffraction average particle size of ranging between 3 and 10 μm and the BET specific surface area of ranging between 60 and 100 $m^2/g$. The use amount of the amorphous silica microparticles is ranging between 6 and 25 parts by weight per hundred parts by weight of the acrylate binder resin.

In the protective film 210 of the present polarizer 20, the light diffusion layer 2121 can optionally add organic microparticles. The organic microparticles in the light diffusion layer 2121 are monodispersity, and the average particle size thereof is less than the average particle size of the amorphous silica microparticles. The laser diffraction average particle size of the suitable spherical organic microparticles in the present invention is ranging between 2.0 µm and 8.0 µm. In the light diffusion layer 2121, the use amount of the spherical organic microparticles is ranging between 6 and 40 parts by weight per hundred parts by weight of the acrylate binder resin.

The suitable organic microparticles used in the light diffusion layer 2121 can be polymethyl methacrylate resin microparticles, polystyrene resin microparticles, styrene-methyl methacrylate copolymer microparticles, melamine microparticles, polyethylene resin microparticles, epoxy resin microparticles, polysiloxane resin microparticles, polyvinylidene fluoride resin microparticles or polyvinyl fluoride resin microparticles. The refractivity of the suitable organic microparticles is ranging between 1.40 and 1.70.

In the protective film 210 of the present polarizer 20, the light diffusion layer 2121 of the protective film 210, the total amount of the amorphous silica microparticles and organic microparticles in the acrylic binder resin is between 15 parts by weight and 50 parts by weight per hundreds parts by weight of the acrylate binder resin. The ratio of the use amount in parts by weight of the organic microparticles and the amorphous silica microparticles is no less than 0.3 and no more than 5.

In the protective film 210 of the present polarizer 20, the acrylate binder resin of the light diffusion layer 2121 comprises a (meth)acrylate composition and a initiator, wherein the (meth)acrylate composition comprises 35 to 50 parts by weight of the polyurethane (meth)acrylate oligomer with a functionality of 6 to 15, 12 to 20 parts by weight of the (meth)acrylate monomer with a functionality of 3 to 6 and 1.5 to 12 parts by weight of the (meth)acrylate monomer with a functionality of less than 3, wherein the polyurethane (meth)acrylate oligomer with a functionality of 6 to 15 is preferably the aliphatic polyurethane (meth)acrylate oligomer with the molecular weight ranging between 1,000 and 4,500.

In the acrylate binder resin, the suitable (meth)acrylate monomer with a functionality of 3 to 6 preferably can be the (meth)acrylate monomer with the molecular weight less than 800, such as, but not limited to pentaerythritol triacrylate (PETA), dipentaerythritol hexaacrylate (DPHA), dipentaerythritol pentaacrylate (DPPA) or combination thereof. The suitable (meth)acrylate monomer with a functionality of less than 3 can be a (meth)acrylate monomer with a functionality of 1 or 2 and the molecular weight thereof is less than 500, such as, but not limited to 1,6-hexanediol diacrylate (HDDA), cyclic trimethylolpropane formal acrylate (CTFA), 2-phenoxyethyl acrylate (PHEA) or isobornyl acrylate (IBOA) or combinations thereof.

In the protective film 210 of the present polarizer 20, the suitable initiator used in the acrylic binder resin of the light diffusion layer 2121 of the interference elimination layer 212 can be selected from those commonly used in the related art, such as, but not limited to, acetophenones-based initiator, diphenylketones-based initiator, propiophenones-based initiator, benzophenones-based initiator, bifunctional α-hydroxyketones-based initiator, acylphosphine oxides-based initiator and the like. The above-mentioned initiators can be used alone or in combination.

In the protective film 210 of the present polarizer 20, the light diffusion layer 2121 can further comprise a leveling agent to provide a good leveling and smoothness of the coated surface. The fluorine-based, (meth)acrylate-based or organosilicon-based leveling agents can be used in the light diffusion layer 2121 of the protective film 210 of the present polarizer 20, In the protective film 210 of the present polarizer 20, the refractive-index-matching layer 2122 of the interference elimination layer 212 is coated on the surface of the light diffusion layer 2121. The refractive-index-matching layer 2122 comprises a binder resin, a plurality of hollow silica nanoparticles, and a leveling agent comprising a perfluoropolyether group-containing (meth)acrylic-modified organosilicone, wherein the average particle size of the hollow silica nanoparticles is ranging between 50 nm and 100 nm.

In the protective film 210 of the present polarizer 20, the binder resin used in the refractive-index-matching layer 2122 of the interference elimination layer 212 can be (meth)acrylate resin or the fluoro-and-acrylic-modified polysiloxane resin. In a preferred embodiment of the refractive-index-matching layer 2122 of the protective film 210 of the polarizer 20, the (meth)acrylate resin used in the refractive-index-matching layer 2122 can be pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, ditrimethylolpropane tetra(meth)acrylate, dipentaerythritol tetra(meth)acrylate or the combination thereof. When the (meth) acrylate resin is used as the binder resin for the refractive-index-matching layer 2122, the use amount of the hollow silica nanoparticles in the refractive-index-matching layer 2122 is ranging between 60 and 130 parts by weight per hundred parts by weight of the (meth) acrylate resin.

In another embodiment of the protective film 210 of the present polarizer 20, the fluoro-and-acrylic-modified polysiloxane resin used in the refractive-index-matching layer 2122 of the interference elimination layer 212 can be a polysiloxane having a siloxane main chain, a branched chain containing a fluoroalkyl group and a branched chain containing an acrylate functional group. The suitable fluoro-and-acrylic-modified polysiloxane resin can be, but not limited to, for example, commercially available siloxane resin products, such as X-12-2430C manufactured by Shin-Etsu Chemical Co., Ltd., Japan. When the fluoro-and-acrylic-modified polysiloxane resin is used as the binder resin for refractive-index-matching layer 2122, the use amount of the hollow silica nanoparticles in the refractive-index-matching layer 2122 is ranging between 90 and 350 parts by weight per hundred parts by weight of the fluoro-and-acrylic-modified polysiloxane resin.

In another embodiment of the protective film 210 of the present polarizer 20, the refractive-index-matching layer 2122 of the interference elimination layer 212 can further comprise a leveling agent. The suitable leveling agent can be a perfluoropolyether group-containing (meth)acrylic-modified organosilicone compound. The suitable leveling agent comprising a perfluoropolyether group-containing (meth)acrylic-modified organosilicone compound can be, but not limited to, for example, commercially available products, such as X-71-1203E, KY-1203, KY-1211 or KY-1207 manufactured by Shin-Etsu Chemical Co., Ltd., Japan. The use amount of the leveling agent varies with the type of binder resin used. When the (meth)acrylate resin is used as the binder resin for the refractive-index-matching layer 2122, the use amount of the leveling agent is ranging between 5 and 20 parts by weight per hundred parts by weight of the (meth)acrylate resin. When the fluoro-and-acrylic-modified polysiloxane resin is used as the binder resin for the refractive-index-matching layer 2122, the use amount of the leveling agent in the refractive-index-matching layer 2122 is ranging between 1 and 45 parts by weight per hundred parts by weight of the fluoro-and-acrylic-modified polysiloxane resin.

In the protective film 210 of the present polarizer 20, the suitable initiator used in the refractive-index-matching layer 2122 of the interference elimination layer 212 can be, but not limited to, for example, commercially available products, such as "Esacure KIP-160", "Esacure One", "Omnirad 184", "Omnirad 907" and "Omnirad TPO" manufactured by IGM Resins B. V., Netherlands, and "TR—PPI-ONE" manufactured by Tronly Enterprise Co., Ltd., Hong Kong.

Another aspect of the present invention is to provide a method for preparing a polarizer. The present method comprises steps of preparing a light diffusion coating solution, coating the light diffusion coating solution on a birefringent substrate, drying the light diffusion coating solution on the birefringent substrate, curing the light diffusion coating solution on the birefringent substrate by radiation or electron beam for forming a light diffusion layer, preparing a refractive-index-matching coating solution, coating the refractive-index-matching coating solution on the light diffusion layer, evaporating the solvent(s) and curing by radiation or electron beam for forming a refractive-index-matching layer on the light diffusion layer. The obtained protective film is adhered to the polarizing layer by the slow axis of the birefringent substrate parallel to the absorption axis of the polarizing layer. The included angle between the absorption axis of the polarizing layer of the present polarizer and the horizontal viewing angle direction of the display is from 0° to 45°.

The light diffusion coating solution of the present invention is prepared by mixing a (meth)acrylate composition comprising a polyurethane (meth)acrylate oligomer with a functionality of 6 to 15, at least one (meth)acrylate monomer with a functionality of 3 to 6, at least one (meth)acrylate monomer with functionality of less than 3, an initiator and adequate solvent(s) and stirred evenly for preparing an acrylate binder resin solution; adding a plurality of amorphous silica microparticles, a leveling agent and an adequate organic solvent into the acrylic binder resin solution and stirring evenly for preparing a light diffusion coating solution. In another embodiment of the present invention, the light diffusion layer can be further added a plurality of organic microparticles.

The refractive-index-matching coating solution of the present invention can be prepared by evenly mixing a binder resin, a plurality of hollow silica nanoparticles, an initiator, a leveling agent and an adequate solvent.

In other embodiments of the present invention, other additives such as antistatic agents, colorants, flame retardants, ultraviolet absorbers, antioxidants, surface modifiers, antimicrobial agent or defoaming agent can be added to the light diffusion coating solution or the refractive-index-matching coating solution as required for providing desired properties.

The solvents suitable for the preparation method can be the organic solvents commonly used in the related art, such as ketones, aliphatic, cycloaliphatic or aromatic hydrocarbons, ethers, esters or alcohols. The (meth)acrylate composition, light diffusion coating solution and the refractive-index-matching coating solution can use one or one more organic solvents. The suitable solvent can be such as, but not limited to acetone, butanone, cyclohexanone, methyl isobutyl ketone, hexane, cyclohexane, dichloromethane, dichloroethane, toluene, xylene, propylene glycol methyl ether, methyl acetate, ethyl acetate, propyl acetate, butyl acetate, n-butanol, isobutanol, isopropanol, diacetone alcohol, propylene glycol methyl ether acetate, cyclohexanol or tetrahydrofuran and the likes.

The aforementioned coating solution can be applied to the substrate surface by any method known in the related art, for example, bar coating, doctor blade coating, dip coating, roll coating, spinning coating, spray coating, slot-die coating and the like.

The obtained protective film is adhered to the polarizer by the slow axis of the birefringent substrate parallel to the absorption axis of the polarizing layer, preferably is continuously adhered via roll to roll method. In a preferred embodiment of the present invention, as the polarizer is adhered to the viewing side of the display, the included angle between the absorption axis of the polarizing layer and the horizontal viewing angle direction of the display is from 0° to 45°.

The present invention will be explained in further detail with reference to the examples. However, the present invention is not limited to these examples.

EXAMPLE

Preparation Example 1: Preparation of Acrylate Binder Resin 42 parts by weight of polyurethane acrylate oligomer (functionality of 6, molecular weight of about 1,600, viscosity of 36,000 cps (at 25° C.), commercially obtained from IGM, Taiwan), 4.5 parts by weight of PETA, 12 parts by weight of DPHA, 3 parts by weight of CTFA, 4 parts by weight of initiator (Chemcure-481, available from Chembridge International Co., Ltd., Taiwan), 24.5 parts by weight of ethyl acetate (EAC) and 10 parts by weight of n-butyl acetate (nBAC) were mixed for 1 hour to obtain an acrylate binder resin.

Example 1

154.5 parts by weight of acrylic binder resin obtained from Preparation Example 1, 9.3 parts by weight of amorphous silica microparticles (Nipsil® SS-50B, average particle size 4 μm, refractive index of 1.45~1.47, available form Tosoh Silica Corp., Japan), 1.7 parts by weight of dispersing agent (DisperBYK-2150, solid content of 5%, solvents: ethyl acetate and propylene glycol methyl ether acetate, available from BYK-Chemie, Germany), 30.9 parts by weight of polyether-modified acrylate copolymer leveling agent (BYK-UV3535, solid content of 10%, solvent: ethyl acetate, available from BYK-Chemie, Germany), 7 parts by weight of silica nanoparticles dispersion (NanoBYK-3650, average particle size 20 nm, solid content 31%, solvent: propylene glycol monomethyl ether acetate/propylene glycol monomethyl ether, commercially obtained from BYK, Germany), 38.6 parts by weight of ethyl acetate (EAC) and 108.1 parts by weight of n-butyl acetate (nBAC) were mixed and stirred to be uniformly dispersed to obtain a first coating solution. The obtained first coating solution was coated on a 50 μm PET film (O321E, available from Mitsubishi Chemical Corp, Japan) with a birefringence ($\Delta n$) of 0.043 and an in-plane retardation R0(550 nm) of 2136 nm. After drying, the coated film was cued by a UV lamp with a radiation dose of 298 mJ/cm$^2$ under a nitrogen atmosphere to form a light diffusion layer with a thickness of 5.5 μm on the PET film.

35 parts by weight of fluorine-containing acrylate-modified polysiloxane resin (X-12-2430C, available from Shin-Etsu Chemical Co., Ltd., Japan), 2 parts by weight of photoinitiator (KIP-160, available from IGM Resin, Netherlands), 22 parts by weight of a perfluoropolyether containing (meth)acryl-modified organosilicone (X-71-1203E, solid content of 20%, solvent: methyl ethyl ketone, available from Shin-Etsu Chemical Co., Ltd., Japan), 187 parts by weight of hollow silica nanoparticle dispersion (Thrulya 4320, solid content 20%, average primary particle size 60 nm, solvent: methyl isobutyl ketone, JGC Catalysts and Chemicals Ltd., Japan), 1377 parts by weight of ethyl acetate (EAC) and 1377 parts by weight of propylene glycol methyl ether acetate (PGMEA) were mixed and stirred for 10 minutes to obtain a second coating solution. The obtained second coating solution was coated on the light diffusion layer. The obtained film coated with the second coating solution was dried in an oven at 80° C. and cured by a UV lamp with a radiation dose of 350 mJ/cm$^2$ under a nitrogen atmosphere to formed a refractive-index-matching layer with a thickness of 0.13 μm on the light diffusion layer. Accordingly, a protective film with an interference elimination layer for a polarizer was obtained.

The optical properties of the protective film obtained from Example 1 were determined in accordance with the measurement described hereinafter. The results were shown in Table 1.

Haze measurement: The haze was measured according to the test method of JIS K7136 by the NDH-2000 Haze Meter (manufactured by Nippon Denshoku industries, Japan).

Internal haze and surface haze measurement: The protective film was adhered to a triacetyl cellulose (TAC) substrate with a thickness of 40 μm (T40UZ, available from Fujifilm, Japan) was adhered onto the protective film by a transparent optical adhesive to make the uneven surface of the protective film smooth. In this state, the internal haze and the total haze of the protective film were measured according to the test method of JIS K7136 by the NDH-2000 Haze Meter, and the surface haze of the protective film could be obtained by deducting the internal haze from the total haze thereof.

Light transmittance measurement: The light transmittance of the protective film was measured according to the test method of JIS K7361 by the NDH-2000 Haze Meter.

Gloss measurement: The gloss of the protective film was measured by adhering the protective film via a transparent optical adhesive to a black acrylic plate acting as a display with a polarizer having orthogonal-axes according to the test method of JIS Z8741 by the BYK Micro-Gloss gloss meter at viewing angles of 20, 60 and 85 degrees.

Clarity measurement: The protective film was cut into a sample of 5×8 cm$^2$, and the sample was measured according to the test method of JIS K7374 by the SUGA ICM-IT image clarity meter, and the sum of the measured values at slits of 0.125 mm, 0.25 mm, 0.50 mm, 1.00 mm and 2.00 mm was the clarity.

Reflectivity measurement: The protective film was measured by adhering the protective film via an adhesive to a black acrylic plate acting as a display with polarizers having orthogonal-axes, and the average reflectivity $R_{SCI}$ including diffusion and specular reflections and the average reflectivity $R_{SCE}$ including diffusion reflection of the protective film were measured by the HITACHI U-4150 spectrometer in a wavelength range of 380~780 nm.

Rainbow mura evaluation: The rainbow mura of the protective film was evaluated by adhering the protective film via a transparent optical adhesive to a 8K liquid crystal display (SHARP, AQUOS LC-70X500T) whose surface protective film was removed. The rainbow mura of the protective film for the polarizer was evaluated at viewing angles of 0 degree and 60 degrees at the bright state of gray level 255 (L255) of liquid crystal display. If there was no identifiable rainbow mura, the evaluation was "extremely excellent"; if there was slightly identifiable rainbow mura, but the quality was acceptable, the evaluation was "excellent"; if there was an obvious identifiable rainbow mura, the evaluation was "poor".

Cloudiness evaluation: The cloudiness was evaluated by adhering the protective film via a transparent optical adhesive to a black acrylate plate and evaluated at viewing angles of 0 degree and 60 degrees. If there was no cloudiness, the evaluation was "extremely excellent"; if there was slightly cloudiness, but the quality was acceptable, the evaluation was "excellent"; if there was obvious cloudiness, the evaluation was "poor".

Example 2

120.3 parts by weight of acrylate binder resin obtained from Preparation Example 1, 9.6 parts by weight of polystyrene microparticles (XX-40IK, average particle size 3 μm, refractive index 1.59, available from Sekisui Plastics Co., Ltd., Japan), 9.6 parts by weight of amorphous silica microparticles (Nipsil® SS-50B), 2.6 parts by weight of dispersant (DisperBYK-2150), 8.1 parts by weight of polyether-modified acrylate leveling agent (BYK-UV3535), 5.4 parts by weight of silica nanoparticles dispersion (NanoBYK-3650), 48.1 parts by weight of ethyl acetate (EAC) and 96.2 parts by weight of n-butyl acetate (nBAC) were mixed and stirred for 1 hour for uniformly dispersing to obtain a first coating solution. The obtained first coating solution was coated on a 50 μm PET film (O321E, available from Mitsubishi Chemical Corp, Japan) with a birefringence (Δn) of 0.043 and an in-plane retardation R0(550 nm) of 2136 nm. After drying, the coated film was cued by a UV lamp with a radiation dose of 298 mJ/cm$^2$ under a nitrogen atmosphere, a light diffusion layer with a thickness of 5.5 μm was formed on PET film.

A second coating solution was prepared by the same method as Example 1. The second coating solution was coated on the light diffusion layer. The obtained film coated with the second coating solution was dried in an oven at 80° C. and cured by a UV lamp with a radiation dose of 350 mJ/cm$^2$ under a nitrogen atmosphere to form a refractive-index-matching layer with a thickness of 0.13 μm on the light diffusion layer. Accordingly, a protective film with an interference elimination layer for a polarizer was obtained.

The optical properties of the protective film obtained in Example 2 were determined as in Example 1 and the results were shown in Table 1.

Example 3

100 parts by weight of the acrylate binder resin obtained from Preparation Example 1, 7.5 parts by weight of amorphous silica microparticles (Nipsil® SS-50B, average particle size 4 μm, refractive index of 1.45~1.47, available form Tosoh Silica Corp., Japan), 2.06 parts by weight of dispersant (DisperBYK-2150), 6.7 parts by weight of polyether-modified acrylate leveling agent (BYK-UV3535), 4.5 parts by weight of silica nanoparticles dispersion (NanoBYK-3650), 80 parts by weight of ethyl acetate (EAC) and 20.2 parts by weight of n-butyl acetate (nBAC) were mixed and stirred for 1 hour to be uniformly dispersed to obtain a first coating solution. The obtained first coating solution was coated on a 50 μm PET film (O321E) same as the PET film used in Example 1 and 2 with a birefringence (Δn) of 0.043 and an in-plane retardation R0(550 nm) of 2136 nm. After drying, the coated film was cued by a UV lamp with a radiation dose of 298 mJ/cm² under a nitrogen atmosphere, then a light diffusion layer with a thickness of 5.2 μm was formed on PET film.

18.3 parts by weight of fluorine-containing acrylate-modified polysiloxane resin (X-12-2430C), 6.1 parts by weight of the fluorinated polyurethane oligomer with a functionality of 6 (LR6000, commercially available from Miwon, Korea), 1.6 parts by weight of photoinitiator (KIP-160), 15 parts by weight of a perfluoropolyether containing (meth)acrylic-modified organosilicone (X-71-1203E), 160 parts by weight of hollow silica nanoparticles dispersion (Thrulya 4320) and 2144 parts by weight of ethyl acetate (EAC) were mixed and stirred for 10 minutes to obtain a second coating solution. The obtained second coating solution was coated on the light diffusion layer. The obtained film coated with the second coating solution was dried in an oven at 80° C. and cured by a UV lamp with a radiation dose of 350 mJ/cm² under a nitrogen atmosphere to form a refractive-index-matching layer with a thickness of 0.13 μm was formed on the light diffusion layer. Accordingly, a protective film with an interference elimination layer for a polarizer was obtained.

The optical properties of the protective film obtained in Example 3 were determined as in Example 1 and the results were shown in Table 1.

Example 4

A protective film was prepared by the same procedures as Example 1, except that a polyethylene terephthalate film (PET) (O321E) with a thickness of 75 μm having a birefringence (Δn) of 0.049 and an in-plane retardation R0(550 nm) of 3654 nm was used. A light diffusion layer with a thickness of 4 μm was formed on the PET film, and a refractive-index-matching layer with a thickness of about 0.13 μm was coated on the light diffusion layer. Accordingly, a protective film with an interference elimination layer for a polarizer was obtained.

The optical properties of the protective film obtained in Example 4 were determined as in Example 1 and the results were shown in Table 1.

Example 5

A protective film was prepared by the same procedures as Example 2, except that a polyethylene terephthalate film (PET) (O321E) with a thickness of 75 μm having a birefringence (Δn) of 0.049 and an in-plane retardation R0(550 nm) of 3654 nm was used. A light diffusion layer with a thickness of 7 μm was formed on the PET film and a refractive-index-matching layer with a thickness of about 0.13 μm was coated on the light diffusion layer thereafter. Accordingly, a protective film with an interference elimination layer for a polarizer was obtained.

The optical properties of the protective film obtained in Example 5 were determined as in Example 1 and the results were shown in Table 1.

Comparative Examples 1 and 2

The light transmittance, haze, $R_{SCI}$(%) and $R_{SCE}$(%) of an uncoated polyethylene terephthalate film (PET) (O321E) with a thickness of 50 μm having a birefringence (Δn) of 0.043 and an in-plane retardation R0(550 nm) of 2136 nm, and an uncoated polyethylene terephthalate film (PET) (O321E) with a thickness of 75 μm having a birefringence (Δn) of 0.049 and an in-plane retardation R0(550 nm) of 3654 nm were determined in accordance with the measurements in Example 1. The results were shown in Table 1.

TABLE 1

The measure results of Examples 1 to 5 and Comparative Examples 1 to 2

| | Example | | | | | | |
|---|---|---|---|---|---|---|---|
| | Comparative Example 1 | Comparative Example 2 | Example 1 | Example 2 | Example 3 | Example 4 | Example 5 |
| Light transmittance (%) | 91.0 | 90.7 | 93.1 | 93.9 | 91.62 | 92.7 | 93.8 |
| Total haze (%) | 1.3 | 1.3 | 52.8 | 68.1 | 35.20 | 53.7 | 68.7 |
| Internal haze (%) | 1.0 | 0.9 | 6.3 | 33.9 | 3.66 | 6.3 | 37.9 |
| Surface haze (%) | 0.3 | 0.4 | 46.5 | 34.2 | 31.54 | 47.4 | 30.8 |
| Gloss 20° | — | — | 0.7 | 0.4 | 0.8 | 0.4 | 0.4 |
| 60° | — | — | 5.1 | 5.1 | 8.2 | 5.5 | 5.5 |
| 85° | — | — | 20.5 | 27.3 | 34.0 | 22.7 | 28.0 |
| Clarity (total) | — | — | 14.3 | 15.7 | 16.6 | 14.2 | 15.3 |
| $R_{SCI}$, % | 5.03 | 5.05 | 1.91 | 2.07 | 1.87 | 1.96 | 1.99 |
| $R_{SCE}$, % | 0.71 | 0.36 | 1.60 | 1.87 | 1.15 | 1.59 | 1.74 |
| (($R_{SCI}$ − $R_{SCE}$), %) | 4.32 | 4.69 | 0.31 | 0.20 | 0.72 | 0.37 | 0.25 |
| $R_{SCE}/(R_{SCI} − R_{SCE})$ | 0.16 | 0.08 | 5.16 | 9.35 | 1.60 | 4.30 | 6.96 |
| Rainbow Mura | poor | poor | extremely excellent | extremely excellent | extremely excellent | extremely excellent | extremely excellent |
| Cloudiness | extremely excellent | extremely excellent | extremely excellent | extremely excellent | extremely excellent | extremely excellent | extremely excellent |

(PET) (O321E) with a thickness of 75 μm having a birefringence (Δn) of 0.049 and an in-plane retardation R0(550 nm) of 3654 nm was used. A light diffusion layer with a thickness of 4 μm was formed on the PET film, and a refractive-index-matching layer with a thickness of about 0.13 μm was coated on the light diffusion layer. Accordingly, a protective film with an interference elimination layer for a polarizer was obtained.

The optical properties of the protective film obtained in Example 4 were determined as in Example 1 and the results were shown in Table 1.

Example 6

A protective film was prepared by the same procedures as Example 1, except that a polyethylene terephthalate film (PET) (O321E) with a thickness of 100 μm having a birefringence (Δn) of 0.052 and an in-plane retardation R0(550 nm) of 5168 nm was used. A light diffusion layer with a thickness of 5.0 μm was formed on the PET film, and a refractive-index-matching layer with a thickness of about 0.13 μm was coated on the light diffusion layer. Accordingly, a protective film with an interference elimination layer for a polarizer was obtained.

The optical properties of the protective film obtained in Example 6 were determined as in Example 1 and the results were shown in Table 2.

Example 7

A protective film was prepared by the same procedures as Example 1, except that a polyethylene terephthalate film (PET) (V7610, commercially available from SKC, Co. Ltd. Korea) with a thickness of 50 μm having a birefringence (Δn) of 0.071 and an in-plane retardation R0(550 nm) of 3526 nm was used. A light diffusion layer with a thickness of 6.6 μm was formed on the PET film, and a refractive-index-matching layer with a thickness of about 0.13 μm was coated on the light diffusion layer. Accordingly, a protective film with an interference elimination layer for a polarizer was obtained.

The optical properties of the protective film obtained in Example 7 were determined as in Example 1 and the results were shown in Table 2.

Example 8

A protective film was prepared by the same procedures as Example 1, except that a polyethylene terephthalate film (PET) (V7610 P, commercially available from SKC, Co. Ltd. Korea) with a thickness of 75 μm having a birefringence (Δn) of 0.034 and an in-plane retardation R0(550 nm) of 2514 nm was used. A light diffusion layer with a thickness of 6.0 μm was formed on the PET film, and a refractive-index-matching layer with a thickness of about 0.13 μm was coated on the light diffusion layer. Accordingly, a protective film with an interference elimination layer for a polarizer was obtained.

The optical properties of the protective film obtained in Example 8 were determined as in Example 1 and the results were shown in Table 2.

Example 9

A protective film was prepared by the same procedures as Example 2, except that a polyethylene terephthalate film (PET) (V7610 P) with a thickness of 75 μm having a birefringence (Δn) of 0.034 and an in-plane retardation R0(550 nm) of 2514 nm was used. A light diffusion layer with a thickness of 6.4 μm was formed on the PET film, and a refractive-index-matching layer with a thickness of about 0.13 μm was coated on the light diffusion layer. Accordingly, a protective film with an interference elimination layer for a polarizer was obtained.

The optical properties of the protective film obtained in Example 9 were determined as in Example 1 and the results were shown in Table 2.

Comparative Example 3

The light transmittance, haze, reflectivity of SCI ($R_{SCI}$, %) and reflectivity of SCE ($R_{SCE}$, %) of an uncoated polyethylene terephthalate film (PET) (V7610) with a thickness of 50 μm having a birefringence (Δn) of 0.071 and an in-plane retardation R0(550 nm) of 3526 nm were determined in accordance with the measurements in Example 1. The results were shown in Table 2.

TABLE 2

The measure results of Examples 6 to 9 and Comparative Example 3

|  | Comparative Example 3 | Example 6 | Example 7 | Example 8 | Example 9 |
|---|---|---|---|---|---|
| Light transmittance (%) | 91.3 | 92.4 | 92.0 | 92.7 | 93.5 |
| total haze (%) | 2.0 | 55.7 | 50.5 | 53.2 | 61.5 |
| internal haze (%) | 1.5 | 6.1 | 5.8 | 3.4 | 34.1 |
| surface haze (%) | 0.5 | 49.6 | 44.7 | 49.8 | 27.4 |
| Gloss 20° | — | 0.2 | 0.5 | 0.4 | 0.6 |
| 60° | — | 4.9 | 6.0 | 5.3 | 8.2 |
| 85° | — | 17.7 | 21.5 | 19.7 | 37.2 |
| Clarity (total) | — | 15.7 | 17.0 | 15.2 | 16.4 |
| $R_{SCI}$, % | 4.79 | 1.94 | 1.90 | 1.86 | 1.87 |
| $R_{SCE}$, % | 0.41 | 1.43 | 1.22 | 1.57 | 1.41 |
| (($R_{SCI} - R_{SCE}$), %) | 4.38 | 0.51 | 0.68 | 0.29 | 0.46 |
| $R_{SCE}/((R_{SCI} - R_{SCE}))$ | 0.09 | 2.80 | 1.79 | 5.41 | 3.07 |
| Rainbow Mura | poor | extremely excellent | extremely excellent | extremely excellent | extremely excellent |
| Cloudiness | extremely excellent | extremely excellent | extremely excellent | extremely excellent | extremely excellent |

As the data shown in Tables 1 and 2, the total haze of the protective films of Examples 1~9 all ranges between 30% and 75% when each of the protective layers comprises a polyester substrate with a birefringence of less than 0.10, and the reflectivity thereof met the relationships: ($R_{SCI}-R_{SCE}$)≤1.0% and $R_{SCE}(R_{SCI}-R_{SCE})$≥1.6. Whether the haze was contributed from the internal haze or the surface haze, the rainbow mura caused by the interference of external ambient light due to the birefringent substrate with a low in-plane retardation R0 (550 nm) can be improved. Even the polyethylene terephthalate (PET) with an in-plane retardation R0(550 nm) of 2000 nm was used, no rainbow mura was observed. Therefore, the use of the birefringent substrate was not limited by the in-plane retardation thereof, and it was not necessary to select special products with a higher in-plane retardation R0(550 nm). The protective films of Examples had comparable light transmission and appearance with those of Comparative Examples without an interference elimination layer, and no cloudiness was found in the protective films of Examples.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A polarizer comprising:
   a polarizing layer having an absorption axis; and
   a protective film disposed on a viewing side of the polarizing layer, comprising:
      a birefringent substrate disposed adjacent to the polarizing layer having a birefringence ($\Delta n$) of not more than 0.10, wherein the birefringent substrate comprises a slow axis and a fast axis perpendicular to each other, and the slow axis is parallel to the absorption axis of the polarizing layer, and an interference elimination layer disposed on a display side surface of the birefringent substrate, which comprises a light diffusion layer disposed on the birefringent substrate and a refractive-index-matching layer disposed on the light diffusion layer;
   wherein a total haze of the protective film ranges between 30% and 75%, and a reflectivity thereof satisfies the relationship:

$(R_{SCI} - R_{SCE}) \leq 1.0\%$, and $R_{SCE}/(R_{SCI} - R_{SCE}) \geq 1.6$;

wherein $R_{SCI}$ is an average reflectivity of diffuse component and specular component (specular component included, SCI) of the protective film, and $R_{SCE}$ is an average reflectivity of diffuse component (specular component excluded, SCE) of the protective film;
   wherein an included angle between the absorption axis of the polarizing layer and a horizontal viewing angle direction of the display ranges between 0° and 45°.

2. The polarizer as claimed in claim 1, wherein the birefringence of the birefringent substrate ranges between 0.02 and 0.09.

3. The polarizer as claimed in claim 1, wherein ($R_{SCI} - R_{SCE}$) ranges between 0.1% and 1.0%.

4. The polarizer as claimed in claim 1, wherein the light diffusion layer has a refractive index of n1, the refractive-index-matching layer has a refractive index of n2, and n2 is less than n1.

5. The polarizer as claimed in claim 4, wherein the refractive index of n1 ranges between 1.50 and 1.70, and the refractive index of n2 ranges between 1.20 and 1.50.

6. The polarizer as claimed in claim 1, wherein $R_{SCE}$ is less than 2.0%.

7. The polarizer as claimed in claim 6, wherein the average reflectivity of diffuse component (specular component excluded, SCE) $R_{SCE}$ of the protective film ranges between 0.8% and 2.0%.

8. The polarizer as claimed in claim 1, wherein the total haze of the protective film is the sum of a surface haze and an internal haze of the protective film, and the surface haze of the protective film is more than 25%.

9. The polarizer as claimed in claim 1, wherein the light diffusion layer has a thickness ranging between 2 μm and 10 μm.

10. The polarizer as claimed in claim 1, wherein the refractive-index-matching layer has a thickness ranging between 0.1 μm and 0.3 μm.

11. The polarizer as claimed in claim 1, wherein the birefringent substrate has a thickness ranging between 10 μm and 150 μm.

12. The polarizer as claimed in claim 1, wherein the birefringent substrate is a uniaxial or biaxial stretched polyester film.

* * * * *